Figure 1:
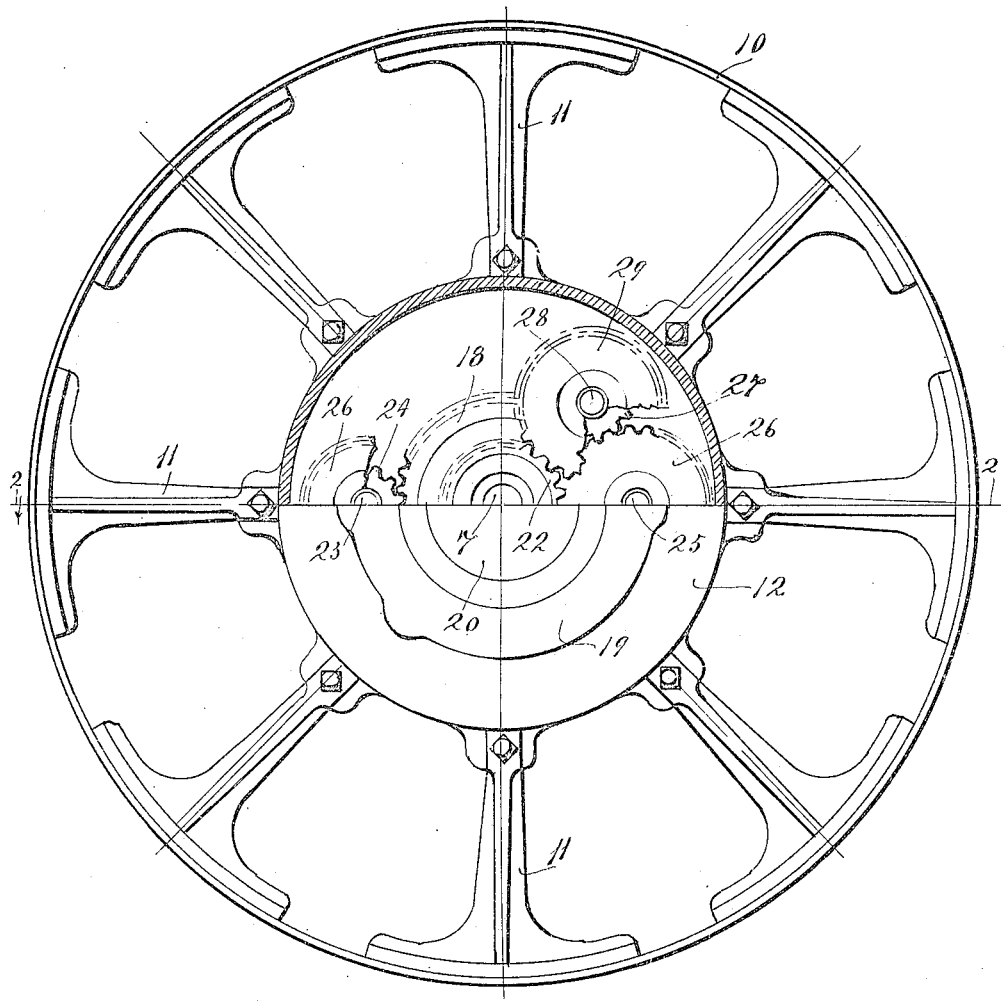

H. O. DAY.
TRANSMISSION TRACTION WHEEL.
APPLICATION FILED DEC. 31, 1918.

1,372,867.

Patented Mar. 29, 1921.
2 SHEETS—SHEET 1.

Witnesses.
H. D. Kilgore
A. H. Opsahl

Inventor,
Herbert O. Day.
By his Attorneys
Williamson & Merchant

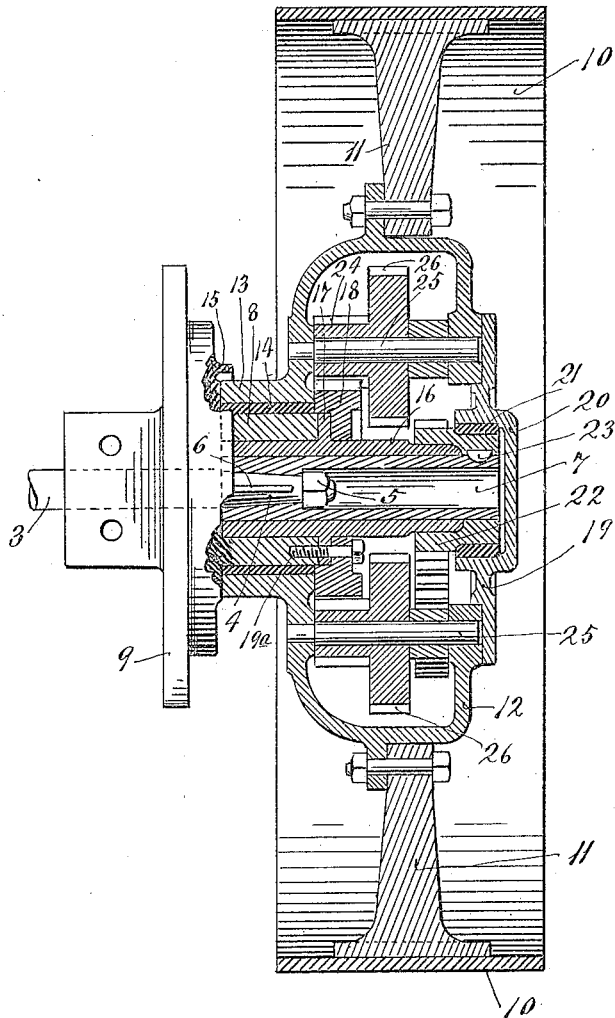

UNITED STATES PATENT OFFICE.

HERBERT O. DAY, OF ST. PAUL, MINNESOTA, ASSIGNOR, BY DIRECT AND MESNE ASSIGNMENTS, TO CONVERTIBLE TRACTOR CORPORATION, OF ST. PAUL, MINNESOTA, A CORPORATION OF SOUTH DAKOTA.

TRANSMISSION TRACTION-WHEEL.

1,372,867.	Specification of Letters Patent.	Patented Mar. 29, 1921.

Application filed December 31, 1918. Serial No. 269,037.

*To all whom it may concern:*

Be it known that I, HERBERT O. DAY, a citizen of the United States, residing at St. Paul, in the county of Ramsey and State of Minnesota, have invented certain new and useful Improvements in Transmission Traction-Wheels; and I do hereby declare the following to be a full, clear, and exact description of the invention, such as will enable others skilled in the art to which it appertains to make and use the same.

My invention relates to that type of transmission mechanism wherein the transmitting spaced reducing gears are incorporated in the traction wheels, and has for its object to improve the construction and operation thereof, as hereinafter more fully described. The present invention is in the nature of an improvement on the transmitting tractor wheel disclosed and claimed in my pending application S. N. 243,793, filed of date, July 8, 1918.

Transmitting wheels of this character are especially adapted for use in converting motor propelled vehicles, such as Ford automobiles and trucks, for example, into tractors which are to be driven at relatively low speeds and correspondingly greater power.

The invention is illustrated in the accompanying drawings, wherein like characters indicate like parts throughout the several views. Referring to the drawings, Figure 1 is a side elevation of the improved traction wheel and transmission mechanism, some parts being sectioned; and Fig. 2 is a vertical section on the line 2—2 of Fig. 1, but with the wheel turned ninety degrees from the position shown in Fig. 1.

The numeral 3 indicates the customary rear axle of a motor propelled vehicle, such, for example, as that of a Ford automobile or truck, which will be mounted in the customary bearings and within the usual rear axle casing, not shown. This axle 3 has the usual tapered ends 4 terminating in threaded gudgeons equipped with nuts 5. The customary vehicle wheels, not shown, are securable on the tapered axle ends 4 by means of nuts 5 and the usual coöperating means such as keys 6.

In this improved wheel, as in the wheel of my application above identified, tubular axle extensions 7, at their inner ends, are snugly fitted onto the tapered axle ends 4 and rigidly, but detachably secured thereto by the nuts 5 and keys 6. The bores in the outer portion of these axle extensions are large enough to permit the engagement of the nuts 5 by means of a suitable socket wrench.

To afford the main bearings for the improved transmission wheels, non-rotary bearing sleeves or annular spindles 8 are telescoped around but spaced concentrically from the respective axle extensions 7 and these sleeves, as shown, are provided with or rigidly secured to non-rotary anchoring plates 9, which, by means not necessary here to consider, are applied around and rigidly secured to the ends of the rear axle casing and rigidly anchored thereto by any suitable means, so far as this invention is concerned, but advisably by means disclosed and claimed in a companion application filed by me of even date herewith and entitled "Auxiliary traction wheel bearing."

Each of the traction wheels comprises a suitable rim 10, suitable spokes 11, and a centrally located and combined hub and gear casing 12, which latter, as shown, is bolted to the spokes. The inner wall of the casing 12 is formed with a bearing hub 13 that is journaled on the non-rotary bearing sleeve or spindle 8, being preferably lined with a bushing 14. Here it may be noted that the anchor plate 9 is provided with an approximately semicircular sand flange 15 that projects laterally and overlaps the upper portion of the hub 8 to protect from sand the joint between the end of the hub 8 and the said plate 9.

Surrounding the axle extension 7 and telescoped into the annular spindle 8 is a long sleeve-like spindle extension 16 that performs an important function presently to be described. This spindle extension 16 has an annular flange 17 that abuts against the end of the spindle 8 and against the annular internal flange of an axially located annular external spur gear 18. Cap screws 19ª are passed through coincident perforations in the gear 18 and flange 17 and are screwed into the spindle 8, thereby anchoring the said gear against rotation and causing the same to securely hold the hub 13, and hence, the entire traction wheel, against lateral displacement. It should be kept in mind that the axle gear 18 is a non-rotary gear.

In its outer wall, the gear casing 12 is provided with a large axle opening that is normally closed by a detachable plate 19 secured thereto in any suitable way, as by bolts or cap screws not shown. The opening noted is large enough to permit the gear 18 and the other gears hereinafter noted to be passed therethrough either to or from working position.

The detachable plate 19 is formed with an axle hub 20. Here it is important to note that the supplemental spindle 16 projects nearly or quite to the inner end of the hub 20. The numeral 22 indicates an axle spur pinion, the inner portion of which is journaled on the outer end of the spindle extension 16 and the outer end of which is journaled in the bushing 21 of the hub 20. Also, it must here be noted that the axle extension 7 projects beyond the spindle extension 16, into the hub 20 and that the outer end or hub portion of the pinion 22 is directly secured to this projecting end of said axle extension by suitable means, such as a key 23. This relative arrangement of spindle extension, axle extension, pinion and hub on the outer portion of the gear casing is of great importance, because it absolutely insures perfect mesh of the gears, regardless of any slight spring in the metallic parts.

The intermediate transmission gears between the anchored gear 18 and rotary pinion 22 are preferably in duplicate but will be described in the singular as follows:

Meshing with the said anchored gear 18 is a spur pinion 24 mounted on a transverse spindle 25 journaled in the sides of the gear casing 12. The pinion 24 is formed integral with or otherwise rigidly secured to a spur gear 26. The gear 26 meshes with another spur pinion 27 that is journaled in still another spindle 28 mounted in the sides of the gear like the spindles 25. Pinion 27 is integral with, or otherwise rigidly secured to a spur gear 29 that meshes with the rotary axle pinion 22. Through the gears described, the traction wheel will be driven in the same direction as the rotary axle, but of course, at a much lower speed and with correspondingly greater power.

The tubular spindle extension 16 affords a support for the outer hub 19 of the wheel at points adjacent to said hub and a telescoped arrangement of the pinion 22 with the said hub and spindle extension carries this support completely into the hub, and thus not only relieves the axle extension from bending stress, but insures perfect alinement of the pinions and gears of the wheel even if there should be a slight bending or a slight movement, due to play, between the spindle and axle extension, or between the spindle and its extension. Otherwise stated, the pinion 22 serves as an alining device for accurately alining concentrically the outer wheel, hub spindle extension, and axle extension. Furthermore, the spindle extension may be made of high grade steel while the spindle 8 proper may be cast as a part of the anchoring plate or block 9.

In traction wheels built on the above plan and thoroughly tested in actual use, the draw bar pull of a tractor has been greatly increased over the power previously obtained with the same tractor including the same engine, but with an earlier form of the transmission tractor wheels. This seems to be due chiefly to the above described arrangement whereby, in the first place, bending or springing out of alinement, the coöperating gears and pinions are substantially eliminated, and whereby, even under slight movement of certain of the parts, the gears and pinions are kept working on the proper pitch lines and binding or cracking of the gears thereby prevented.

What I claim is:

1. The combination with a traction wheel having a gear casing in its hub structure, said casing having inner and outer hubs, of a tubular non-rotary spindle having a detachable spindle extension extended into said gear casing and terminating near the outer hub thereof, the inner hub of said casing being journaled around said spindle, and an axial non-rotary gear anchored to said spindle within said casing, an axial rotary pinion journaled in the outer hub of said casing and on the extended end of said spindle extension, an axle journaled in said main spindle and provided with an axle extension journaled in and extended through said spindle extension and connected to said rotary axial pinion, and planetary speed reducing gears journaled to said gear casing and interconnected between said non-rotary gear and rotary pinion.

2. The combination with a traction wheel having a gear casing in its hub structure, said casing having inner and outer hubs, of a tubular non-rotary spindle having a detachable spindle extension extended into said gear casing and terminating near the outer hub thereof, the inner hub of said casing being journaled around said spindle, and an axial non-rotary gear anchored to said spindle within said casing, an axial rotary pinion journaled in the outer hub of said casing and on the extended end of said spindle extension, an axle journaled in said main spindle and provided with an axle extension journaled in and extended through said spindle extension and connected to said rotary axial pinion, and planetary speed reducing gears journaled to said gear casing and interconnected between said non-rotary gear and rotary pinion, the said gear casing having a detachable plate to which its said outer hub is applied, the said plate, when removed, permitting the said gears to be applied within or removed from said casing.

3. The combination with a tubular non-rotary main spindle and a tubular wheel spindle seated therein and having an intermediate outstanding flange, of an annular non-rotary axial gear applied around said spindle and against the said flange thereof, screws applied through said annular gear and spindle flange and screwed into said main spindle, a traction wheel journaled on said main spindle and held against lateral displacement by said non-rotary gear, an axle extended through said spindle, a pinion applied to the projected inner end of said axle, and planetary speed reducing gears journaled on said wheel and interconnected between said rotary pinion and non-rotary gear.

In testimony whereof I affix my signature in presence of two witnesses.

HERBERT O. DAY.

Witnesses:
CLARA DEMAREST,
BERNICE BAUMANN.